(12) United States Patent
Hsieh

(10) Patent No.: US 7,458,754 B2
(45) Date of Patent: Dec. 2, 2008

(54) TELESCOPIC COVERING DEVICE FOR MACHINE TOOL

(75) Inventor: Tom Hsieh, Nan Tou (TW)

(73) Assignee: Hardinge Taiwan Ltd., Nantou (TW)

( * ) Notice: Subject to any disclaimer, the term of this patent is extended or adjusted under 35 U.S.C. 154(b) by 227 days.

(21) Appl. No.: 11/599,031

(22) Filed: Nov. 14, 2006

(65) Prior Publication Data

US 2008/0110376 A1      May 15, 2008

(51) Int. Cl.
*B23Q 11/08* (2006.01)

(52) U.S. Cl. .................. 409/134; 29/DIG. 56; 160/202; 160/223

(58) Field of Classification Search .................. 409/134, 409/137; 160/202, 222, 223; 74/608; 29/DIG. 56, 29/DIG. 94
See application file for complete search history.

(56) References Cited

U.S. PATENT DOCUMENTS

| | | | | |
|---|---|---|---|---|
| 3,578,061 A | | 5/1971 | Friedrich | |
| 3,704,959 A | * | 12/1972 | John | 409/134 |
| 4,676,666 A | * | 6/1987 | Pfluger et al. | 384/15 |
| 4,771,906 A | * | 9/1988 | Hennig et al. | 220/8 |
| 4,773,457 A | * | 9/1988 | Bierbrauer et al. | 74/608 |
| 5,169,223 A | | 12/1992 | Suzuki et al. | |
| 5,807,043 A | | 9/1998 | Blank | |
| 6,431,249 B1 | * | 8/2002 | Tabellini | 160/222 |

* cited by examiner

*Primary Examiner*—Erica E Cadugan
(74) *Attorney, Agent, or Firm*—Charles E. Baxley

(57) ABSTRACT

A machine tool includes a table slidably supported on a carrier and movable relative to the carrier by a driving device, a telescopic covering device having two or more cover members telescopically slide relative to each other in response to a sliding movement between the table and the carrier. A connecting device includes a tubular member attached to the inner cover member, and a rod attached to the carrier and movable into and out of the tubular member when the inner cover member is moved relative to the carrier for guiding the table to smoothly slide relative to the carrier.

11 Claims, 5 Drawing Sheets

TELESCOPIC COVERING DEVICE FOR MACHINE TOOL

BACKGROUND OF THE INVENTION

1. Field of the Invention

The present invention relates to a telescopic covering device for machine tools, and more particularly to a telescopic covering device including a movable or telescopic linking device for coupling the smallest cover member to the saddle or machine base or carrier of the machine tools, and for allowing the smallest cover member to be slid or adjusted or moved relative to the saddle or machine base or carrier of the machine tools.

2. Description of the Prior Art

Typical machine tools comprise a table slidably disposed or supported on a carrier, and the carrier is then further slidably disposed or supported on a saddle or machine base of the machine tools with one or more further carriers for allowing the table to be slid or adjusted or moved relative to the saddle or the machine base or the carriers of the machine tools.

While working with the machine tools or when the work pieces are cut or drilled or machined by the machine tools, cut chips or particles or contaminants will be generated and dropped into the space between the table and the carriers and the saddle or the machine base or the carriers of the machine tools and may interfere or damage the sliding engagements between the table and the carriers and the saddle or the machine base or the carriers of the machine tools.

For suitably shielding or covering the sliding engagements between the table and the carriers and the saddle or the machine base or the carriers of the machine tools, one or more telescopic covering devices are provided and disposed or coupled between the table and the carriers and the saddle or the machine base or the carriers of the machine tools and provided for collecting the cut chips or particles or contaminants and for preventing the cut chips or particles or contaminants from entering into the space between the table and the carriers and the saddle or the machine base or the carriers of the machine tools.

For example, U.S. Pat. No. 3,578,061 to Hsscheck discloses one of the typical covering devices for protecting the guiding paths of machine tools and comprising a number of box-shaped members telescopically movable into and out of each other and coupled together with a coupling device which may couple the respective adjacent box-shaped members to each other in response to the sliding movement between the box-shaped members.

Normally, one end of the typical covering device is attached or secured to the table, and the other end or the smallest cover or box-shaped member fixed or secured to the saddle or the machine base or the carriers of the machine tools. However, in some of the machine tools, the smallest cover or box-shaped member may be required to be moved or adjusted relative to the saddle or the machine base or the carriers of the machine tools, and the typical covering device thus may not be used to suitably cover or shield or protect the saddle or the machine base or the carriers of the machine tools.

U.S. Pat. No. 5,169,223 to Suzuki et al. discloses another typical telescopic cover apparatus also comprising a number of cover members telescopically movable into and out of each other and coupled together with a coupling or linking device. However, similarly the smallest cover member is solidly secured to the stationary saddle of the machine tools such that the typical telescopic cover apparatus also may not be used to suitably cover or shield or protect the saddle or the machine base or the carriers of some of the machine tools.

U.S. Pat. No. 5,807,043 to Blank discloses a further typical interlocking machine tool way cover also comprising a number of cover members or individual segments telescopically movable into and out of each other and coupled together with a coupling or linking device. However, the smallest cover member or segment may be extended out of the screw conveyor and the actual way surface of the machine tools such that the typical interlocking machine tool way cover also may not be used to suitably cover or shield or protect the saddle or the machine base or the carriers of some of the machine tools.

The present invention has arisen to mitigate and/or obviate the afore-described disadvantages of the conventional telescopic covering devices for the machine tools.

SUMMARY OF THE INVENTION

The primary objective of the present invention is to provide a telescopic covering device including a movable or telescopic linking device for coupling the smallest cover member to the saddle or machine base or carrier of the machine tools, and for allowing the smallest cover member to be smoothly slid or adjusted or moved relative to the saddle or machine base or carrier of the machine tools.

In accordance with one aspect of the invention, there is provided a machine tool comprising a carrier, a table slidably supported on the carrier and movable along and relative to the carrier, a driving device for driving the table to move relative to the carrier, a telescopic covering device including a first or greatest cover member attached to the table and moved in concert with the table, a second or smallest cover member to be movably coupled to the carrier, and at least one third or intermediate cover member telescopically coupled between the first and the second cover members for allowing the first and the second and the third cover members to telescopically slide relative to each other in response to a sliding movement between the table and the carrier, a connecting device including a tubular member attached to the second cover member and moved in concert with the second cover member, a rod attached to the carrier and slidably engaged into the tubular member and movable into and out of the tubular member when the second cover member is moved relative to the carrier, and a spring biasing device for biasing the table to move or to be recovered relative to the carrier in order to force the tubular member to engage onto the rod.

The carrier includes a seat disposed thereon for supporting a first end of the rod. The seat includes a recess formed therein and defined by a bottom surface and two side fences for stably supporting the first end of the rod.

The rod includes a flat surface formed in the first end of the rod for engaging with the bottom surface of the seat and for stably anchoring and supporting the first end of the rod in the seat of the carrier.

The connecting device includes a cushioning member attached to the rod for engaging with the tubular member and for preventing the tubular member from striking onto the rod.

The tubular member includes a bearing barrel engaged in a first end of the tubular member for slidably and smoothly receiving and supporting the rod in the tubular member and for facilitating a sliding engagement between the rod and the tubular member. The tubular member includes a bearing ring engaged in a first end of the tubular member for preventing particles or contaminants from entering into the tubular member.

The second cover member includes an end wall, the tubular member includes a first end secured to the end wall of the second cover member. The second cover member includes a plate attached to the end wall, and the tubular member includes a peripheral flange extended radially and outwardly from the first end of the tubular member and secured to the plate of the second cover member with such as fasteners.

The second cover member includes a board engaged onto an outer portion of the end wall and secured to the plate and the end wall and the peripheral flange the tubular member with the fasteners. The tubular member includes at least one draining port formed in a bottom portion of the tubular member for such as water draining purposes.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
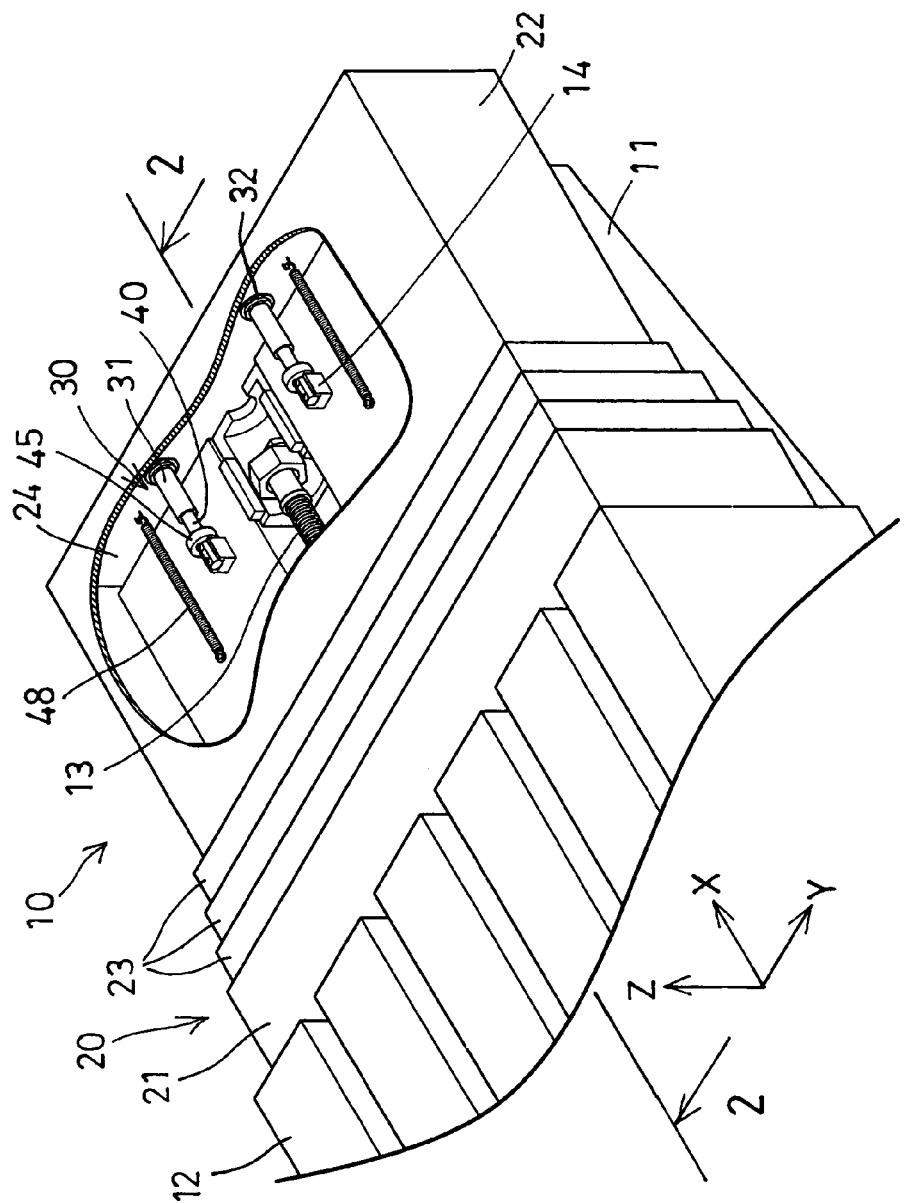
FIG. 1 is a partial perspective view of a telescopic covering device for a machine tool in accordance with the present invention.
Figure 2:
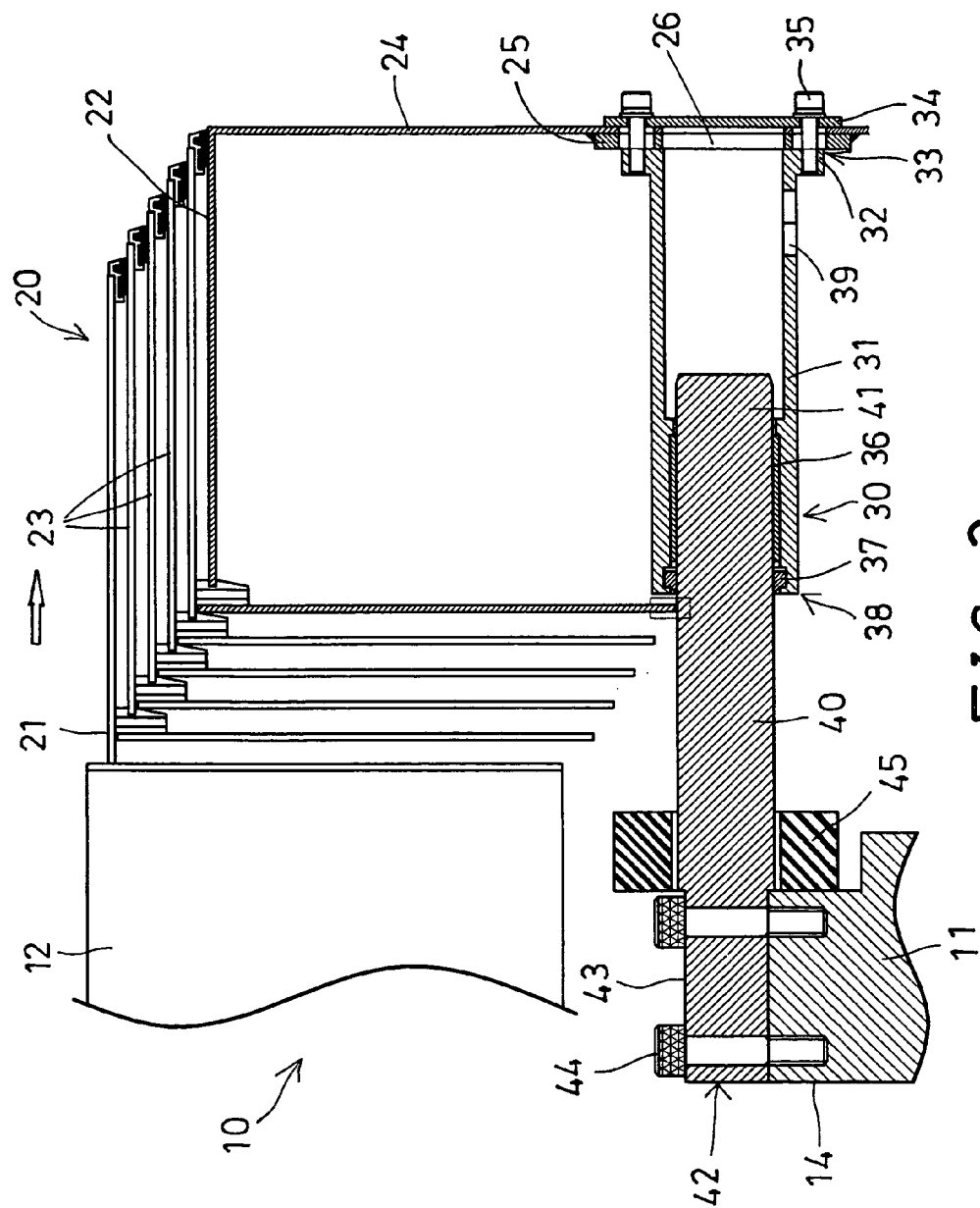
FIG. 2 is a partial cross sectional view of the telescopic covering device taken along lines 2-2 of FIG. 1.

Referring to the drawings, and initially to FIGS. 1 and 2, a machine tool 10 in accordance with the present invention comprises a carrier 11 slidably disposed or supported on a saddle or machine base (not shown), and a table 12 slidably disposed or supported on the carrier 11 and preferably movable along the longitudinal axis or direction of the carrier 11, and a bolt or hydraulic or pneumatic moving device or other driving means or device 13 disposed or supported on the carrier 11 (FIG. 1) and coupled to the table 12 for moving the table 12 along the longitudinal axis or direction or the X-axis of the carrier 11. The coupling or attachment of the driving device 13 to the table 12 is typical and will not be described in further details.

The machine tool 10 in accordance with the present invention further comprises a telescopic covering device 20 disposed or coupled between the table 12 and the carrier 11 for preventing the cut chips or particles or contaminants that may be generated by the cutting tools or the drilling tools or the other machining tool members (not shown) of the machine tools from entering into the space between the table 12 and the carrier 11 and for preventing the sliding engagement between the table 12 and the carrier 11 from being interfered or damaged by the cut chips or particles or contaminants and thus for facilitating the sliding engagement between the table 12 and the carrier 11.

The telescopic covering device 20 includes an outer or first or greatest cover member 21 attached or secured to the table 12 and moved in concert with the table 12, an inner or second or smallest cover member 22 to be resiliently or movably or adjustably coupled to the carrier 11 with a connecting device 30, and one or more third or intermediate cover members 23 telescopically coupled to or between the outer or greatest cover member 21 and the inner or smallest cover member 22 for allowing the cover members 21-23 to telescopically slide relative to each other in response to the sliding movement between the table 12 and the carrier 11. The coupling between the table 12 and the carrier 11 is also typical and will not be described in further details.

Figure 5:
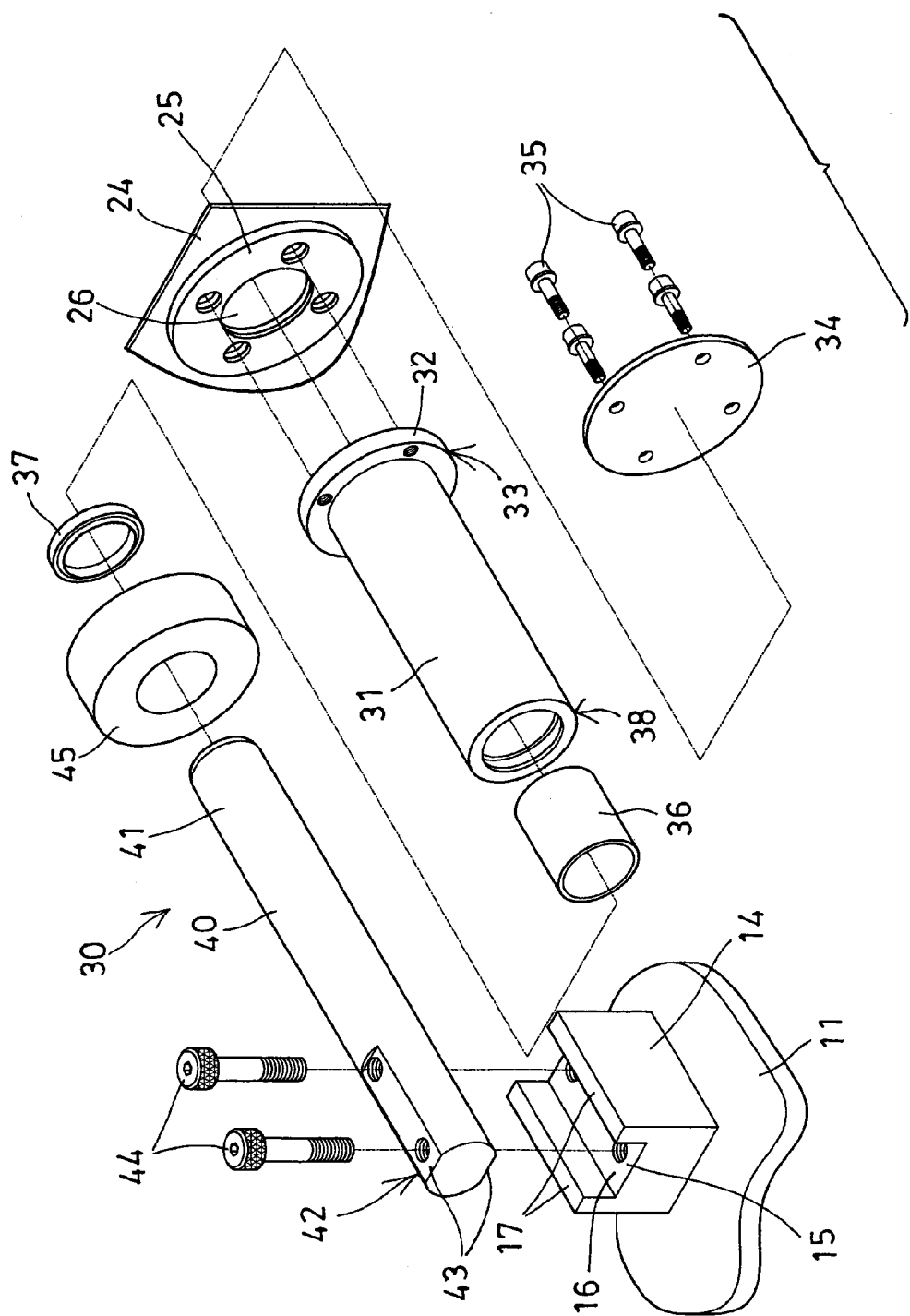
FIG. 5 is a partial exploded view of the telescopic covering device for the machine tool.

The inner or smallest cover member 22 of the telescopic covering device 20 includes an end or outer wall 24, and one or more (such as two) plates 25 attached or secured to the end wall 24 and made of stronger materials for reinforcing the end wall 24 and/or for coupling to the connecting device 30, and the plates 25 each include an orifice 26 formed therein. The carrier 11 includes one or more (such as two, FIG. 1) blocks or seats 14 disposed thereon and each having a recess 15 formed in the upper portion thereof and formed or defined by a bottom surface 16 and two side fences 17 (FIG. 5). The blocks or seats 14 are also provided for coupling to the connecting device 30.

The connecting devices 30 each include a cylindrical or tubular member 31 having a peripheral flange 32 provided on one end 33 or extended radially and outwardly from the one end 33 thereof for engaging onto the inner portion of the end wall 24 or of the respective plates 25, and a gasket or board 34 engaged onto the outer portion of the end wall 24 or of the respective plates 25 and secured to the end wall 24 and the plates 25 and the peripheral flange 32 of the tubular member 31 with such as latches or fasteners 35 or the like for allowing the tubular member 31 to be solidly attached or fixed or secured to the end wall 24 of the smallest cover member 22 and to be moved in concert with the smallest cover member 22.

The connecting devices 30 each further include a gasket or lubricating sleeve or bearing barrel 36 and/or a sealing or bearing ring 37 disposed or engaged in the other end 38 of the tubular member 31 for slidably and smoothly receiving or supporting one end or inner end 41 of a rod 40 in the tubular member 31 and for facilitating the sliding engagement between the rod 40 and the tubular member 31, and one or more draining ports 39 formed in the bottom portion of the tubular member 31 and preferably located closer to the one end 33 of the tubular member 31 for allowing the humidity or water to flow out of the tubular member 31 and/or for preventing an increasing air pressure from being generated within the tubular member 31. The bearing or sealing ring 37 may prevent the other particles or contaminants from entering into the tubular member 31.

The rod 40 includes another end or outer end 42 to be engaged into the recess 15 of the block or seat 14 of the carrier 11, and one or more cut-off portions or flat surfaces 43 formed in the outer end 42 of the rod 40 for engaging with the bottom surface 16 of the block or seat 14 of the carrier 11 and for stably seating or anchoring and supporting the outer end 42 of the rod 40 in the block or seat 14 of the carrier 11 and for preventing the rod 40 from being rotated relative to the block or seat 14 of the carrier 11. The rod 40 may thus be relatively moved into and out of the tubular member 31 of the connecting device 30 when the smallest cover member 22 is moved or slid relative to the carrier 11, such that the sliding engagement between the rod 40 and the tubular member 31 may thus be formed and acted as a guiding means or device for guiding the smallest cover member 22 to move or slide relative to the carrier 11.

One or more spring biasing means or members 48 may further be provided and engaged or coupled between the smallest cover member 22 and the carrier 11 for recovering the smallest cover member 22 or for biasing or forcing the rod 40 to relatively engage into the tubular member 31 or for biasing or forcing the tubular member 31 to relatively engage onto the rod 40 after the smallest cover member 22 has been moved away from the carrier 11 against the spring biasing means or members 48. One or more resilient or soft or cushioning rings or members 45 may further be provided and engaged onto the rod 40 for engaging with the tubular member 31 and for preventing the tubular member 31 from striking onto the rod 40 inadvertently.

Figure 4:
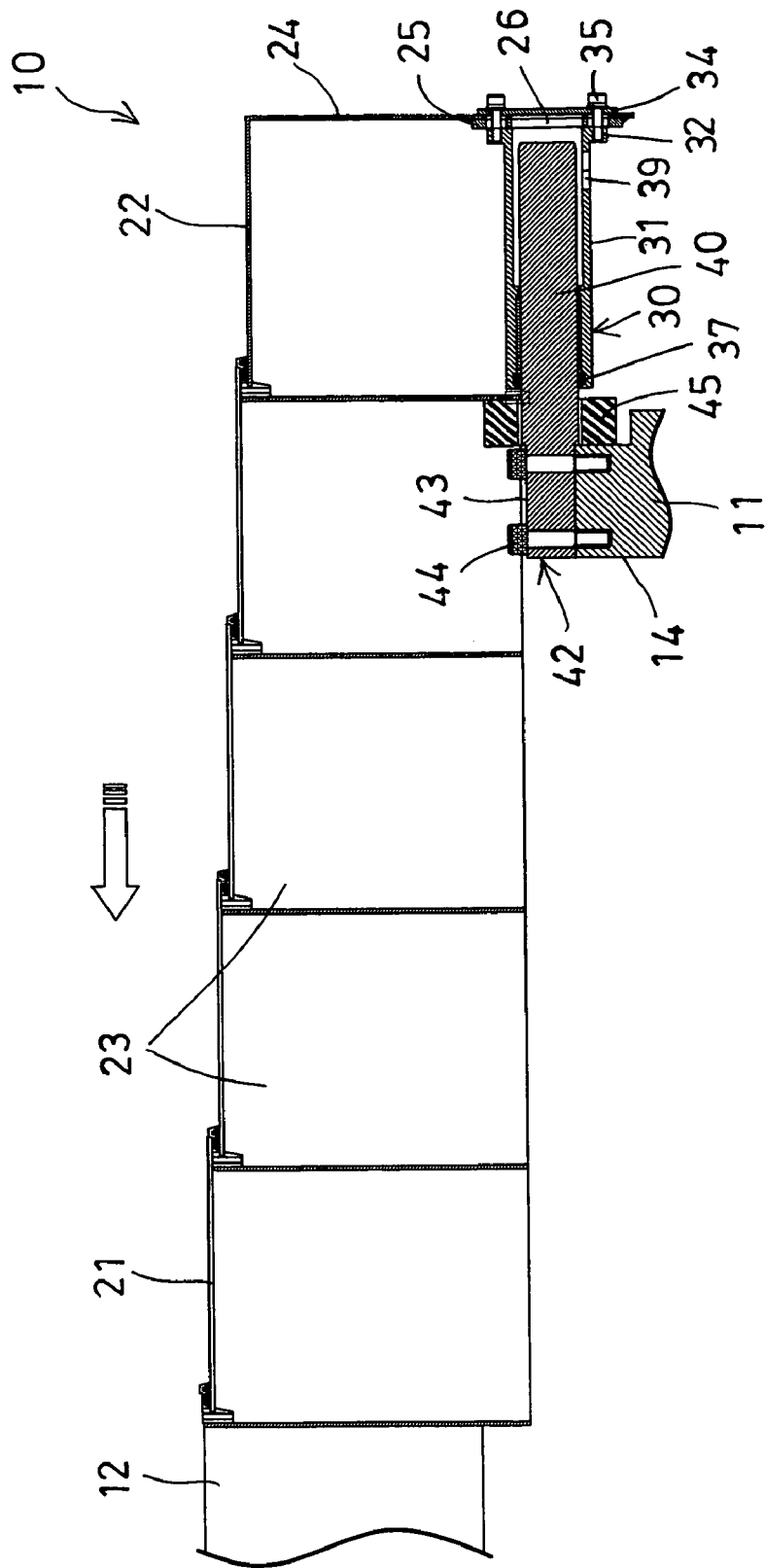

In operation, as shown in FIG. 4, when the table 12 is caused to move along the carrier 11, such as to move leftward relative to the carrier 11 by the driving device 13, the outer or greatest cover member 21 and/or the intermediate cover members 23 may also be pulled or caused to move relative to the carrier 11 in a telescopic way in order to suitably cover and shield the space between the table 12 and the carrier 11. At this moment, the tubular member 31 may be forced to engage onto the rod 40 and/or to engage onto the resilient or soft or cushioning rings or members 45. The engagement between of the tubular member 31 onto the resilient or soft or cushioning rings or members 45 may be used to limit the table 12 to move or to slide relative to the carrier 11.

Figure 3:
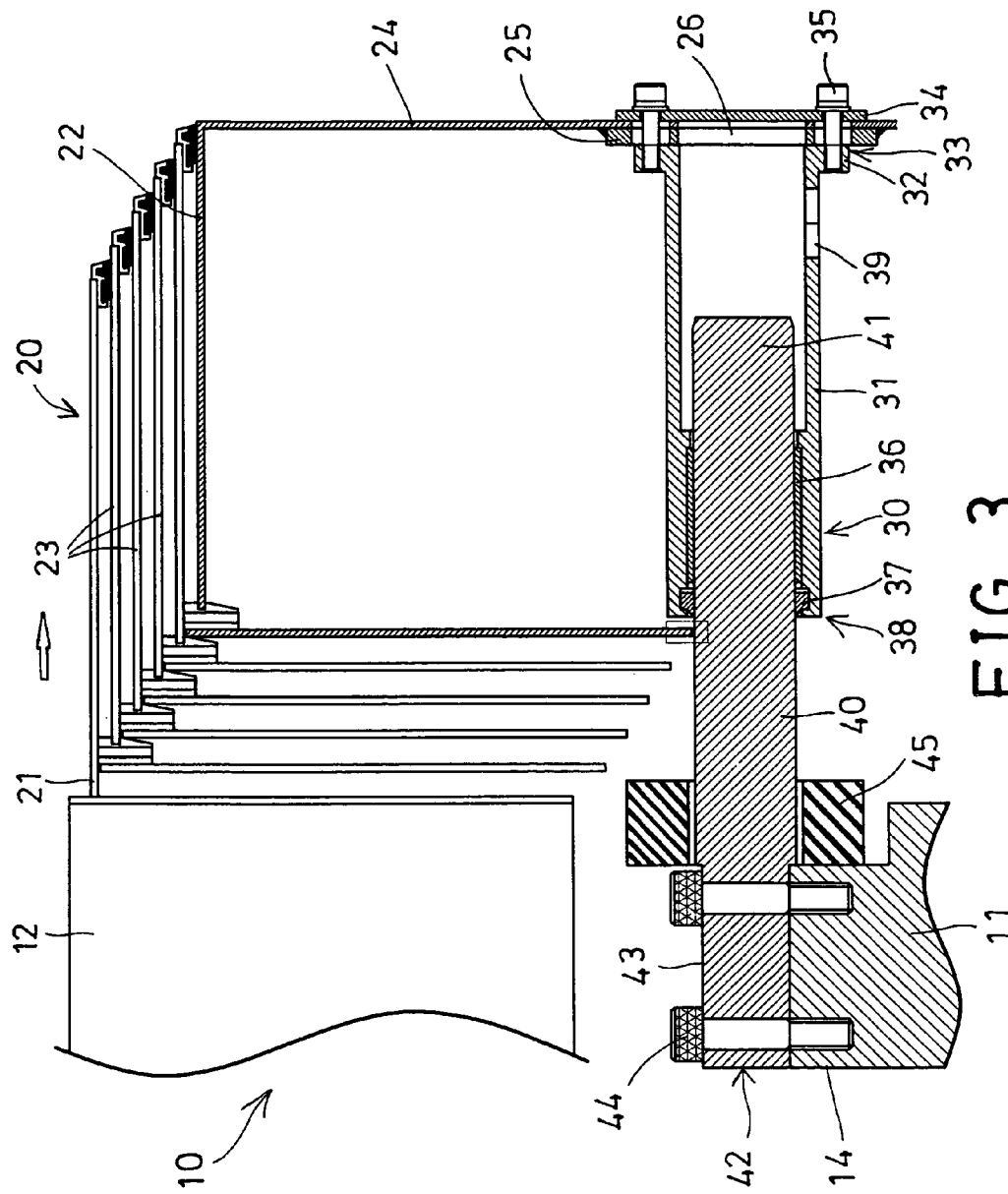
FIGS. 3, 4 are partial cross sectional views similar to FIG. 2, illustrating the operation of the telescopic covering device.

As shown in FIGS. 2, 3, when the table 12 is caused to move along the carrier 11, such as to move rightward relative to the carrier 11 by the driving device 13 until the outer or greatest cover member 21 and the intermediate cover members 23 are engaged onto the smallest cover member 22, the tubular member 31 may be forced to move away from the rod 40 when the smallest cover member 22 is further moved away from the carrier 11 or moved rightward relative to the carrier 11 against the spring biasing means or members 48 by the driving device 13 such that the cut chips or particles or contaminants generated by the machine tools and dropped onto the cover members 22-23 may be moved or wiped off the cover members 22-23 rightwardly.

The tubular member 31 may be forced to engage onto the rod 40 and/or to engage onto the resilient or soft or cushioning rings or members 45 again by the spring biasing means or members 48 when the table 12 is caused to move leftward relative to the carrier 11 by the driving device 13 again. It is to be noted that the telescopic structure or the sliding engagement of the tubular member 31 relative to the rod 40 allows the lengths of the tubular member 31 and the rod 40 to be suitably reduced. The rod 40 is slidably engaged in the tubular member 31 without extending out of the tubular member 31 such that the rod 40 may be prevented from being dirtied by the cut chips or particles or contaminants generated by the machine tools.

Accordingly, the telescopic covering device in accordance with the present invention includes a movable or telescopic linking device for coupling the smallest cover member to the saddle or machine base or carrier of the machine tools, and for allowing the smallest cover member to be slid or adjusted or moved relative to the saddle or machine base or carrier of the machine tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine tool comprising:
   a carrier,
   a table slidably supported on said carrier and movable along and relative to said carrier,
   means for driving said table to move relative to said carrier,
   a telescopic covering device including a first cover member attached to said table and moved in concert with said table, a second cover member to be movably coupled to said carrier, and at least one third cover member telescopically coupled between said first and said second cover members for allowing said first and said second and said at least one third cover members to telescopically slide relative to each other in response to a sliding movement between said table and said carrier,
   a connecting device including a tubular member attached to said second cover member and moved in concert with said second cover member, a rod attached to said carrier and slidably engaged into said tubular member and movable into and out of said tubular member when said second cover member is moved relative to said carrier, and
   means for biasing said table to move relative to said carrier in order to force said tubular member to engage onto said rod.

2. The machine tool as claimed in claim 1, wherein said carrier includes a seat disposed thereon for supporting a first end of said rod.

3. The machine tool as claimed in claim 2, wherein said seat includes a recess formed therein and defined by a bottom surface and two side fences for stably supporting said first end of said rod.

4. The machine tool as claimed in claim 3, wherein said rod includes a flat surface formed in said first end of said rod for engaging with said bottom surface of said seat and for stably anchoring and supporting said first end of said rod in said seat of said carrier.

5. The machine tool as claimed in claim 1, wherein said connecting device includes a cushioning member attached to said rod for engaging with said tubular member and for preventing said tubular member from striking onto said rod.

6. The machine tool as claimed in claim 1, wherein said tubular member includes a bearing barrel engaged in a first end of said tubular member for slidably and smoothly receiving and supporting said rod in said tubular member and for facilitating a sliding engagement between said rod and said tubular member.

7. The machine tool as claimed in claim 1, wherein said tubular member includes a bearing ring engaged in a first end of said tubular member for preventing particles or contaminants from entering into said tubular member.

8. The machine tool as claimed in claim 1, wherein said second cover member includes an end wall, said tubular member includes a first end secured to said end wall of said second cover member.

9. The machine tool as claimed in claim 8, wherein said second cover member includes a plate attached to said end wall, said tubular member includes a peripheral flange extended radically and outwardly from said first end of said tubular member and secured to said plate of said second cover member.

10. The machine tool as claimed in claim 9, wherein said second cover member includes a board engaged onto an outer portion of said end wall and secured to said plate and said end wall and said peripheral flange of said tubular member.

11. The machine tool as claimed in claim 1, wherein said tubular member includes at least one draining port formed in a bottom portion of said tubular member for water draining purposes.

* * * * *